United States Patent
Hösker

(10) Patent No.: US 9,783,251 B2
(45) Date of Patent: Oct. 10, 2017

(54) OVERHEAD CONVEYING APPARATUS FOR MOUNTING ON THE CEILING OF AN ASSEMBLY PLANT

(71) Applicant: Torsten Hösker, Osterburken (DE)

(72) Inventor: Torsten Hösker, Osterburken (DE)

( * ) Notice: Subject to any disclaimer, the term of this patent is extended or adjusted under 35 U.S.C. 154(b) by 0 days.

(21) Appl. No.: 15/022,449

(22) PCT Filed: Aug. 14, 2014

(86) PCT No.: PCT/EP2014/067421
§ 371 (c)(1),
(2) Date: Apr. 20, 2016

(87) PCT Pub. No.: WO2015/043827
PCT Pub. Date: Apr. 2, 2015

(65) Prior Publication Data
US 2016/0221622 A1     Aug. 4, 2016

(30) Foreign Application Priority Data

Sep. 24, 2013 (DE) .................. 20 2013 104 354 U

(51) Int. Cl.
*B65G 17/20*     (2006.01)
*B65G 17/32*     (2006.01)
(Continued)

(52) U.S. Cl.
CPC ............ *B62D 65/18* (2013.01); *B65G 17/20* (2013.01); *B65G 41/006* (2013.01)

(58) Field of Classification Search
None
See application file for complete search history.

(56) References Cited

U.S. PATENT DOCUMENTS 3,792,635 A     2/1974    Goransson
4,292,897 A *   10/1981   Wakabayashi ........ B61B 10/025
                                                                                    104/172.4
(Continued)

FOREIGN PATENT DOCUMENTS

CN     102114594 A    7/2011
DE     94 16 172        12/1994
(Continued)

OTHER PUBLICATIONS

PCT English Language Translation of the International Preliminary Report on Patentability, PCT/EP2014/067421, dated Apr. 7, 2016.
(Continued)

*Primary Examiner* — Kavel Singh
(74) *Attorney, Agent, or Firm* — Quarles & Brady LLP

(57) ABSTRACT

The invention relates to an overhead conveying device (01) for integration in an assembly plant in order to transport vehicle components (02) by means of a conveying device (03) arranged on the overhead conveying device (01), said overhead conveying device having at least one supporting framework (04), wherein the supporting framework (04) has a length of more than 5 m and a width of more than 2 m, and wherein the conveying device (03) can be mounted at the supporting framework (04), and wherein the supporting framework (04) and the conveying device (03) form a stiff conveying layer, in or at which the vehicle components (02) can be transported from an input point to an output point, and wherein the overhead conveying device (01) is mounted in suspended fashion, with the help of bearing means (13), on the ceiling structure (10) of the assembly plant, and wherein the suspended mounting of the overhead conveying device (01) on the ceiling structure (10) of the assembly plant gives rise to the formation, between the underside of the supporting framework (04) and the upper side of the floor of the assembly plant, of a free space (18), which is suitable for component assembly and/or for component transport purposes and in which it is possible to walk and/or drive, wherein the supporting framework (04) comprises
(Continued)

frame elements (05) with a closed frame cross-section, wherein the component plane spanned in each instance by the frame element (05) extends substantially vertically upwards, and wherein the surface normal of the component plane spanned in each instance by the frame element (05) points in the conveying direction.

13 Claims, 6 Drawing Sheets

(51) Int. Cl.
    *B65D 65/18*     (2006.01)
    *B62D 65/18*     (2006.01)
    *B65G 41/00*     (2006.01)

(56) References Cited

U.S. PATENT DOCUMENTS

| | | | |
|---|---|---|---|
| 4,936,222 A | 6/1990 | Murai | |
| 5,226,525 A * | 7/1993 | Dooley | B65G 17/20 |
| | | | 105/149 |
| 6,814,219 B2 * | 11/2004 | Shimizu | B62D 65/18 |
| | | | 104/172.4 |
| 7,191,571 B2 | 3/2007 | Schools et al. | |

FOREIGN PATENT DOCUMENTS

| | | |
|---|---|---|
| DE | 198 51 437 | 5/2000 |
| EP | 0 963 904 | 12/1999 |
| JP | 2002096778 A | 4/2002 |
| JP | 2003341818 A | 12/2003 |
| WO | 01/38162 | 5/2001 |
| WO | 03/074348 | 9/2003 |
| WO | 2010/038629 | 4/2010 |

OTHER PUBLICATIONS

The International Search Report dated Nov. 6, 2014 for International Application No. PCT/EP2014/067421.

State Intellectual Property Office of People'S Republic of China, First Office Action and Search Report, Application No. 201480052705.6, dated Apr. 24, 2017.

\* cited by examiner

OVERHEAD CONVEYING APPARATUS FOR MOUNTING ON THE CEILING OF AN ASSEMBLY PLANT

CROSS-REFERENCE TO RELATED APPLICATIONS

This application represents the national stage entry of PCT International Application No. PCT/EP2014/067421 filed Aug. 14, 2014 and claims priority to German Utility Model Application No. 20 2013 104 354.0 filed Sep. 24, 2013. The contents of this application are hereby incorporated by reference as if set forth in their entirety herein.

The invention relates to an overhead conveying device for integration in an assembly plant, which is suitable for transporting vehicle components, according to the preamble of claim 1.

In assembly plants for manufacturing vehicles, different types of conveying devices as well as of overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices that leave enough free space in which it is possible to walk and/or drive, below the overhead conveying device, to allow suitably moving a person or other conveying vehicles, for instance forklift trucks. Usually, free headroom of at least 2.5 m or more is the aim so that forklift trucks or other transport vehicles are able to cross below the overhead conveying device. Overhead conveying devices of this kind are also employed in order to obtain additional assembly space, wherein, standing on the floor, another conveying device or another kind of assembly plant, such as an assembly robot, may be arranged underneath the overhead conveying device. To integrate overhead conveying devices of this kind into an assembly plant in a building, it is common in the state of the art to put a supporting framework together from steel girders or the like for erecting the actual conveying device on-site in the building, wherein the struts and pillars usually have been welded together on the construction site. This allows for an adaptation to the conditions at hand both with regard to the assembly plants and with regard to the facilities of the building, and assembly plants or building facilities already present can in particular be taken into account.

For a start, the generic overhead conveying device is intended for integration into an assembly plant for transporting vehicle components. The type of the vehicle components is generally without relevance in this case. The substantial feature is that the overhead conveying device is integrated in an assembly concept, making it possible here to manufacture a vehicle by transporting the assigned vehicle parts. For this purpose, the overhead conveying device has a supporting framework and at least one conveying device, for instance a pushing chain conveyor.

Generically speaking, the supporting framework has a length of more than 5 m and a width of more than 2 m. The height at which the supporting framework of the overhead conveying device is affixed above the floor of the designated building is again without general relevance as long as a sufficiently high headroom remains below the supporting framework. The conveying device of the overhead conveying device, for instance a pushing chain conveyor, may be mounted at the supporting framework and allows transporting the corresponding vehicle components, the transport usually taking place along the longitudinal direction of the overhead conveying device.

Furthermore, the supporting framework comprises bearing means, with the help of which the overhead conveying device is mounted in the assembly plant. Here, the mounting of the overhead conveying device has to absorb considerable forces and has to be very stable in order to realize the required tolerances with regard to the accuracy of deposit of the vehicle components moved. Here, the generic overhead conveying device is characterized in that it is not positioned on the floor of the assembly hall, but is hung from the ceiling of the assembly hall. Hence, in other words, this means that the supporting framework and the conveying device have been hung from the ceiling of the building. Because of this, a substantially completely free space can be realized between the underside of the supporting framework and the upper side of the floor of the assembly plant. Columns and gantries for positioning the overhead conveying device, which stand on the floor of the assembly plant themselves, are not needed.

In the known overhead conveying devices for a suspended mounting on the ceiling of a building, it is a considerable disadvantage that the necessary dynamic stability is not achieved by the known supporting framework structures.

In order to avoid the disadvantages known from the state of the art, it is therefore the object of the present invention to propose a new overhead conveying device.

Said object is attained by an overhead conveying device according to the teaching of claim 1.

Advantageous embodiments of the invention are the subject-matter of the dependent claims.

The basic idea of the overhead conveying device in accordance with the invention is that the supporting framework comprises frame elements with a closed frame cross-section, wherein the component plane spanned by the frame element extends substantially vertically upwards, and wherein the surface normal of the component plane spanned by the frame elements points in the conveying direction. Owing to the closed frame cross-section of the frame elements, the stability of the supporting framework is increased decisively without a plurality of components being needed hereunto. Here, the frame elements are to be arranged such that they extend vertically upwards and that the respective surface normal of the frame elements points in the conveying direction. Here, the supporting framework structure may comprise a plurality of frame elements, which are arranged one behind the other or side by side.

The conveying device may be connected to the supporting framework in any manner. In accordance with a preferred constructive variant, it is envisaged that the conveying device, for instance a chain pushing conveyor, is arranged between the outer sides of two adjacent frame elements in each instance. At the same time, several frame elements are also arranged one behind the other in each instance, such that a sufficient number of fastening spots for fastening the conveying device is present. In the event of several conveying devices having to be fastened to the supporting framework, a corresponding number of frame elements may also be arranged so as to be adjacent to one another in each instance.

For achieving the highest possible stability of the frame elements, it is advantageous if the same have been manufactured from steel profiles.

The steel profiles themselves should preferably have a closed profile cross-section in order to thereby achieve a high connection stiffness of the frame elements.

It equally serves to increase the connection stiffness if the steel profiles of the frame elements have been welded to one another at the joint surfaces.

Regarding the stability of the supporting framework structure, it is highly relevant that the frame elements arranged one behind the other in each instance are connected one to the other in a sufficiently stiff fashion. This can be managed in a particularly simple and cost-effective manner in that the frame elements arranged one behind the other and pertaining to the supporting framework are in each instance at least connected to one another by two side parts, which extend in a parallel fashion relative to the conveying direction.

Here, the side parts may preferably be arranged at the inner side of the cross-section of the frame elements arranged one behind the other in the conveying direction, such that they can be held, at least during assembly, by the frame elements without further ado. Moreover, a projection is avoided by the arrangement of the frame elements at the inner side of the cross-section.

At generic overhead conveying devices, it is frequently necessary to dispose a maintenance walkway in order to make it possible for operating personnel to conduct maintenance works at the plant. This applies in particular since the generic overhead conveying devices are arranged in suspended fashion on the ceiling of the assembly hall and maintenance work thus cannot be carried out in the usual manner from the floor of the assembly hall. Said maintenance walkways may, at the inventive overhead conveying device, preferably be realized in the supporting framework, along the longitudinal side of the conveying devices.

In order to realize a high mechanical stability while the weight is relatively low, it is particularly advantageous if the supporting framework is designed in the manner of a spatial truss, which comprises longitudinally and transversely oriented and diagonally interconnected and upright interconnected supporting beam elements. Owing to such a truss structure made up of supporting beam elements, for instance steel profiles, a very high stability is realized while the weight is relatively low.

A further augmentation in the mechanical stability may be realized if the supporting beam elements of the supporting framework have a closed tubular cross-section.

Regarding the manufacturing costs and the mechanical stability, it is particularly advantageous if the supporting framework is formed by a welded structure.

One embodiment of the invention is illustrated as an example in the drawings and will be explained in the following.

Figure 1:
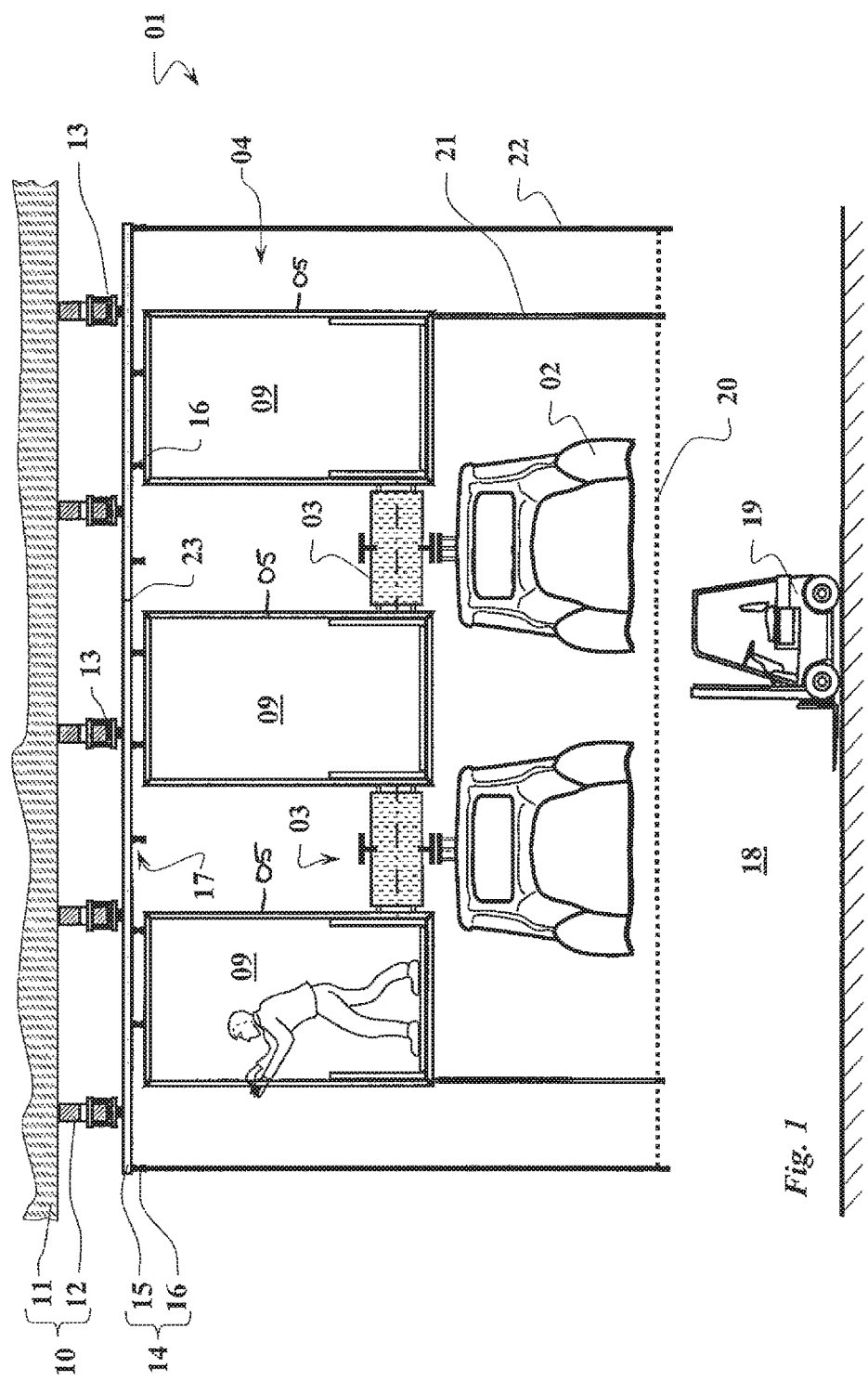
FIG. 1 shows an inventive overhead conveying device in a schematized side view.

FIG. 1 shows an overhead conveying device 01 for integration in an assembly plant in order to transport vehicle components 02, for instance body shells. Here, the vehicle components are transported with the help of conveying devices 03, for instance chain accumulating conveyors. In order to guarantee sufficient mechanical stability of the overhead conveying device 01 even in case of dynamic loads and to be able to comply with the necessary transfer tolerances when transferring the vehicle components 02 to downstream parts of the assembly plants, for instance when transferring to handling robots, the overhead conveying device 01 is furnished with supporting frameworks 04. Here, each supporting framework 04 consists of several frame elements 05, which are arranged one behind the other in the conveying direction with their open cross-section, and of side parts 06, 07 and 08 fastened in the frame elements 05. The side parts 06, 07 and 08 form a spatial truss and will be explained in even greater detail in the following (see description on FIG. 8). Each of the conveying devices 03 is fastened between the side parts 06 and 07 of adjacent supporting frameworks 04. Each supporting framework 04 forms a maintenance walkway 09, in which the operating personnel 10 may move safely parallel to the conveying devices 03. The complete overhead conveying device 01 is envisaged to be fastened in suspended fashion on a ceiling structure 10. Here, the actual roof 11 rests on concrete struts 12. In order to be able to fasten the overhead conveying device 01 to the concrete struts 12, bearing means 13 are hooked into the clearances in the concrete struts 12 with their respective crosshead 14 and are welded to a roof bar from below. In this manner, a stable friction fit is realized between the bearing means 13 on the one hand and the concrete struts 12 on the other hand.

In order to be able to fix the supporting frameworks 04 to the concrete struts 12 and to the bearing means 13 fastened thereto, in a simple manner, a fastening plane 14 is disposed in accordance with the invention, which has been formed from criss-crossing flexurally stiff steel girders 15 and 16. The steel girders 15 and 16 are connected to one another, namely welded together, in load-transmitting fashion at the points of intersection 17 and form a grid of four-sided, namely rectangular, intermediate zones 25. The bearing means 13 is a fastener that can fix the fastening plane 14 to ceiling structure of the assembly plant.

Owing to the suspended fastening of the supporting frameworks 04 and of the conveying devices 03 fastened thereto, a free space 18, in which it is possible to walk and drive, is formed below the overhead conveying device 01. In the free space 18, assembly devices, for instance handling robots, may be erected or the free space 18 may be used for transporting goods by way of conveying apparatuses, for instance forklift trucks 19. In order to realize sufficient protection against accidents caused by parts that fall down, a safety floor 20 is fastened above the free space 18 and below the overhead conveying device 01. The steel struts 21 and 22 envisaged for fastening the safety floor 20 may be welded to the supporting frameworks 04 and to the fastening plane 14.

Figure 2:
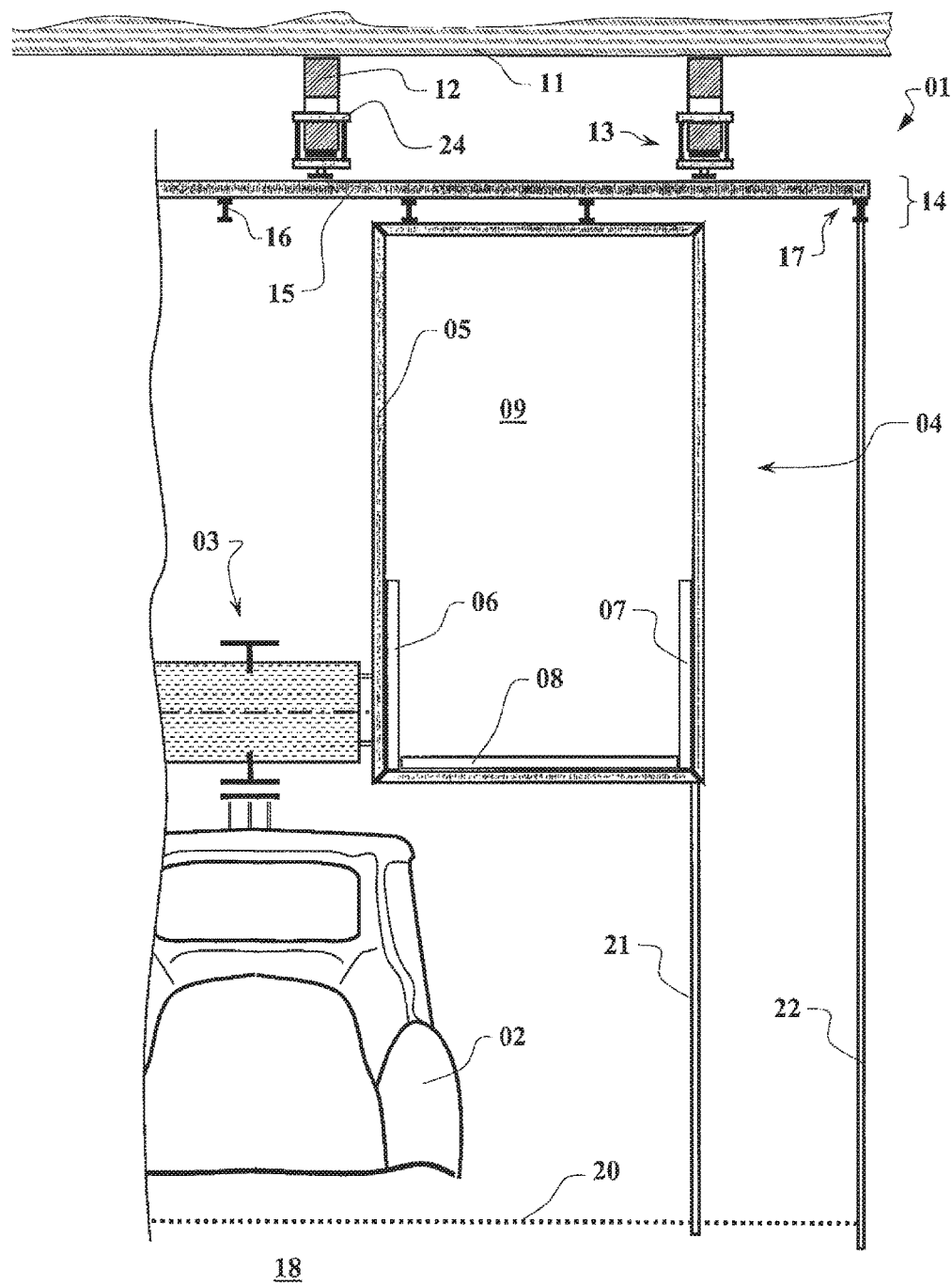
FIG. 2 shows the overhead conveying device in accordance with FIG. 1 in an enlarged cut-out.

FIG. 2 shows the overhead conveying device 01 in an enlarged detail. The bearing means 13 hooked into the concrete struts 12 with the help of the crossheads 14 can be seen.

Figure 3:
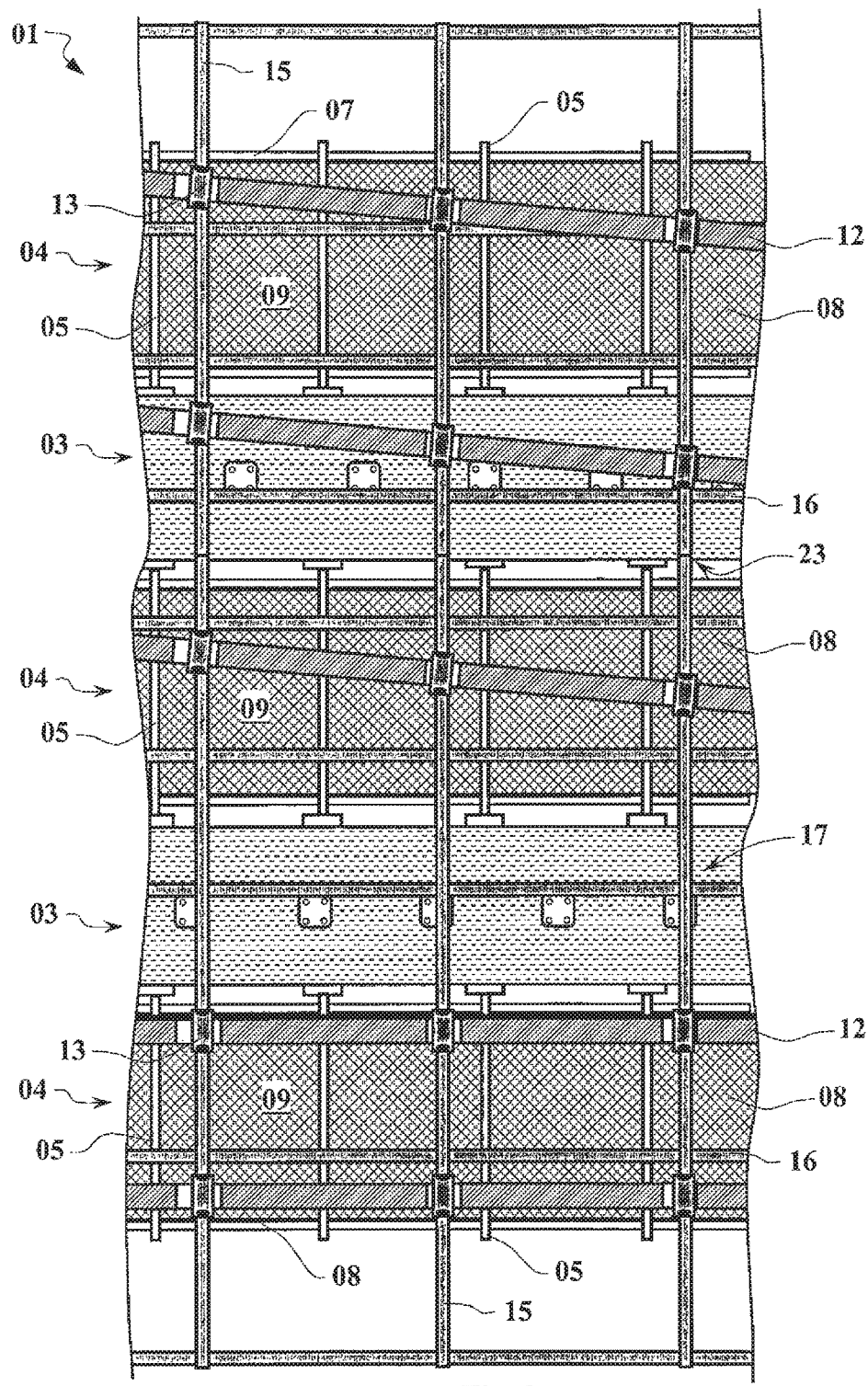
FIG. 3 shows the overhead conveying device in accordance with FIG. 1 in a view from above.

FIG. 3 shows the overhead conveying device 01 in a view from above, wherein the roof 11 is not illustrated in FIG. 3. The concrete struts 12 partially do not run in a parallel fashion relative to one another and partially run at a different distance. In order to nonetheless be able to fasten the overhead conveying device 01 to the ceiling 10 in a simple fashion, the fastening plane 14, consisting of the steel girders 15 and 16, is inserted between the concrete struts 12 and the bearing means 13 fastened thereto, on the one hand, and the supporting frameworks 04, on the other hand. Because of this, it is possible to arrange the position of the bearing means 13 relative to the position of the supporting frameworks 04 in a decoupled fashion relative to one another. It can be seen that the steel girders 15 and 16 of the fastening plane 14 form a grid of rectangular intermediate zones 25, wherein said grid may be fastened by its plurality of points of intersection to the concrete struts 12, on the one hand, and the supporting frameworks 04, on the other hand, in a simple manner.

Figure 4:
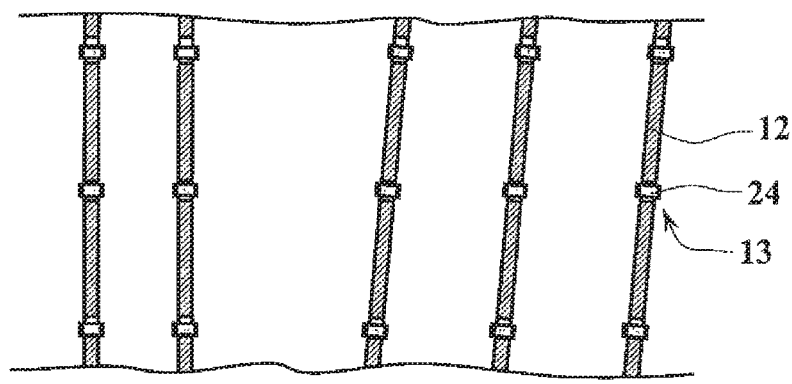
FIG. 4 shows the bearing means fastened on the ceiling structure of the assembly hall and pertaining to the overhead conveying device in accordance with FIG. 3 in a view from above.
Figure 5:
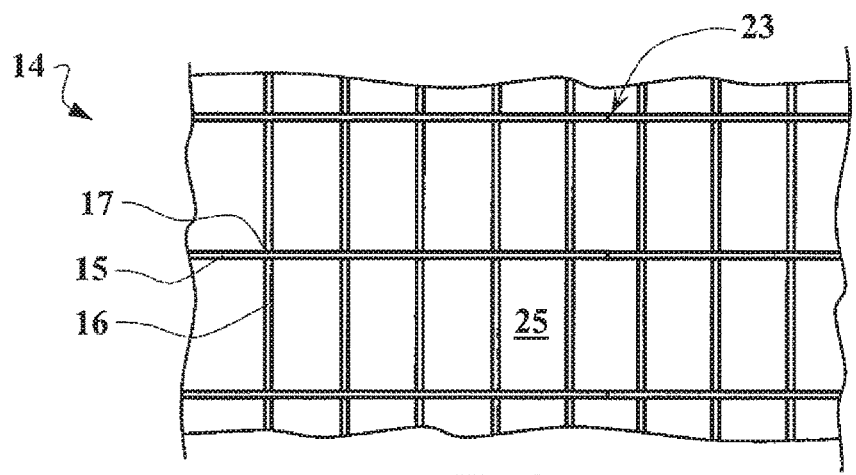
FIG. 5 shows the fastening plane of the overhead conveying device in accordance with FIG. 3 in a view from above.
Figure 6:
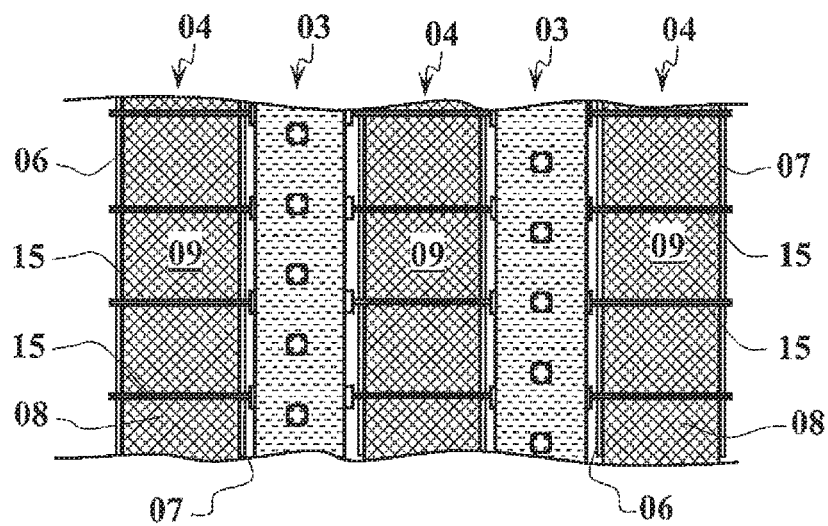
FIG. 6 shows the supporting frameworks and the conveying devices of the overhead conveying device in accordance with FIG. 3 in a view from above.

FIG. 4, FIG. 5 and FIG. 6 show the different parts of the overhead conveying device 01 in a layered form, in each instance in a view from above. FIG. 4 shows the concrete struts 12 having the bearing means 13 fastened thereto. The fastening plane 14 formed from the steel girders 15 and 16 is suspended beneath the bearing means 13. FIG. 5 shows the steel girders 15 and 16. In joint areas 23, steel girder portions have been welded together in order to thus ultimately form steel girders 15 and 16 with the necessary length. FIG. 6 shows the supporting frameworks 04 having the two conveying devices 03 which are arranged therebetween, and which are suspended from the fastening plane 14.

Figure 7:
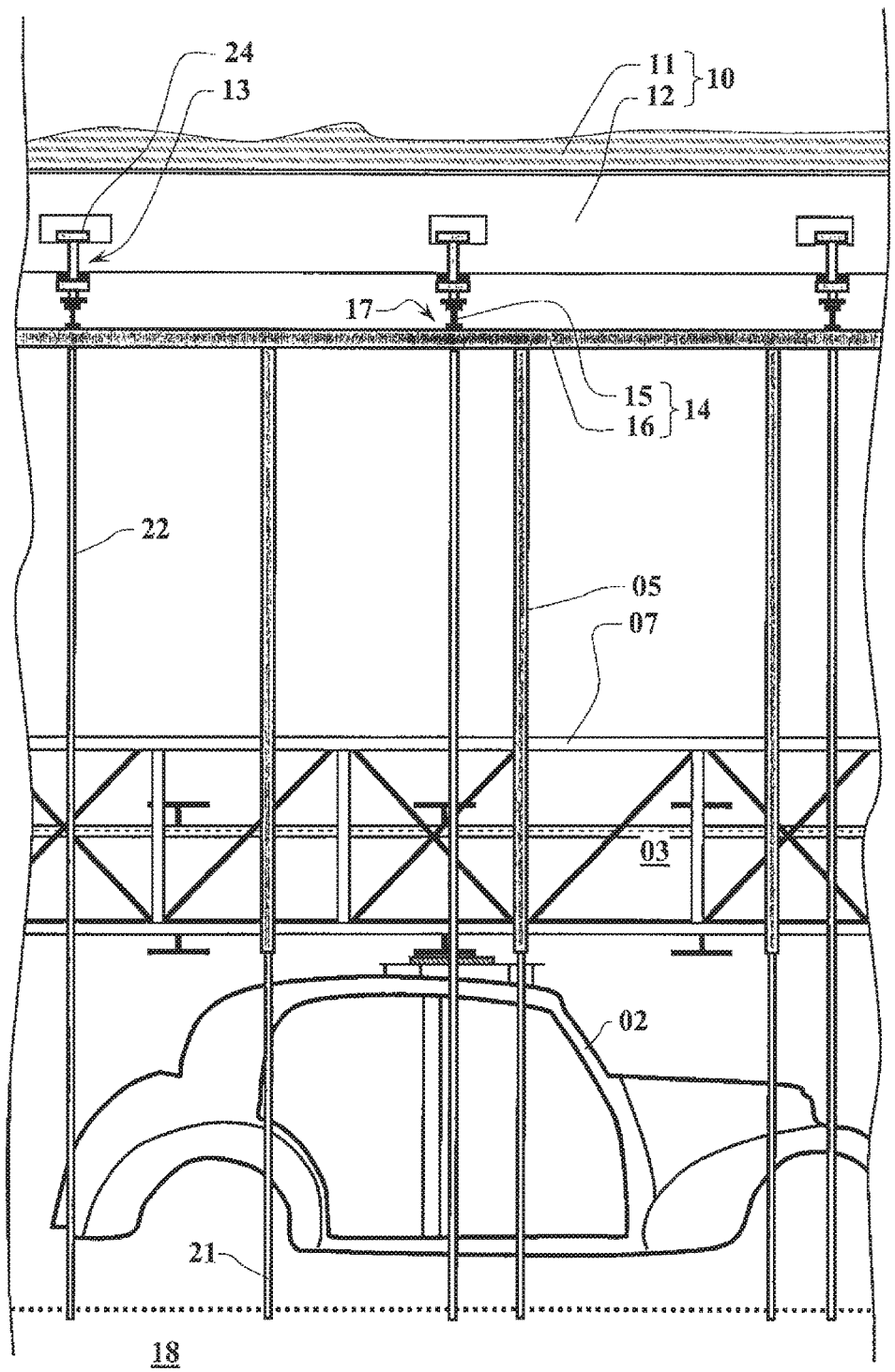
FIG. 7 shows the overhead conveying device in accordance with FIG. 1 in a side view.

FIG. 7 shows the overhead conveying device 01 in a side view. The frames 05 pertaining to the supporting frameworks 04 and being arranged one behind the other can be seen, said supporting frameworks being fastened to the underside of the steel girders 16 in each instance. In the frames 05, the side parts 06, 07 and 08, which are embodied in the manner of truss structures, are held, wherein welded connections are in each instance present between the frames 05 and the side parts 06, 07 and 08, in order to reinforce the overhead conveying device 01.

Figure 8:
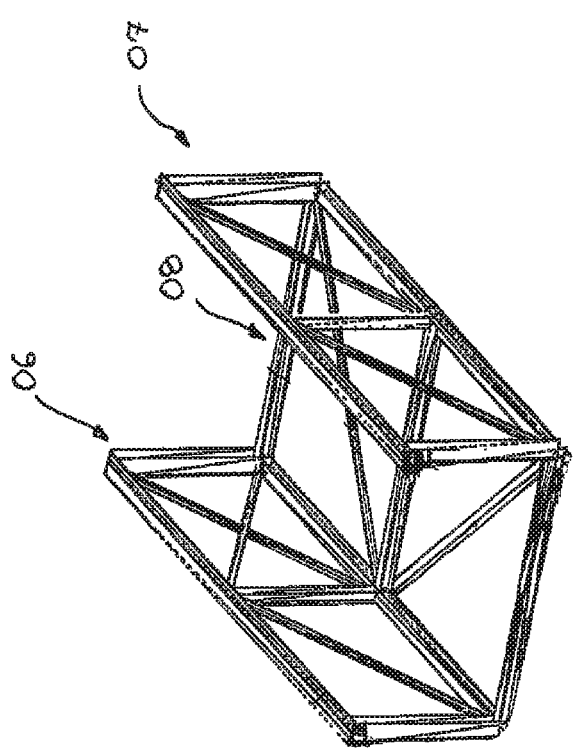
FIG. 8 shows a module of the supporting framework of the overhead conveying device in accordance with FIG. 1, said module being manufactured in the manner of a truss, in a perspective view.

FIG. 8 shows the side parts 06, 07 and 08 in a perspective view. The side parts 06, 07 and 08 can be transported and incorporated as prefabricated modules, as it is illustrated in FIG. 8.

The invention claimed is:

1. An overhead conveying device for integration in an assembly plant in order to transport vehicle components, said overhead conveying device comprising:
at least a first and a second supporting framework, each having a length of more than 5 m and a width of more than 2 m and including frame elements forming a closed frame cross-section;
a conveyor mounted between the first and second supporting framework, wherein each supporting framework includes a structural element defining a substantially vertical plane and a surface normal to the structural element points in the conveying direction of the conveyor, wherein the first and second supporting framework and the conveyor form a stiff conveying layer, in or at which the vehicle components can be transported from an input point to an output point; and
fasteners for fixing the overhead conveying device in suspended fashion on ceiling structure of the assembly plant, and wherein the overhead conveying device suspended on the ceiling structure of the assembly plant by the fastener forms a free space between an underside of the supporting framework and an upper side of the floor of the assembly plant suitable for component assembly and/or for component transport and in which it is possible to walk and/or drive.

2. The overhead conveying device according to claim 1, in which the conveying device is arranged between the outer sides of two adjacent frame elements in each instance.

3. The overhead conveying device according to claim 1, in which the frame elements are formed from steel profiles.

4. The overhead conveying device according to claim 3, in which the steel profiles of the frame elements have a closed profile cross-section.

5. The overhead conveying device according to claim 3, in which the steel profiles of the frame elements are welded to one another at joint surfaces.

6. The overhead conveying device according to claim 1, in which at least two side parts of the supporting framework are fastened to the frame elements and arranged one behind the other in the conveying direction, said side parts extending substantially parallel relative to the conveying direction.

7. The overhead conveying device according to claim 6, in which the side parts are arranged at an inner side of a cross-section of the frame elements arranged one behind the other in the conveying direction.

8. The overhead conveying device according to claim 6, in which the frame elements arranged one behind the other in the conveying direction form a maintenance walkway together with the side parts.

9. The overhead conveying device according to claim 6, in which the side parts are designed in the manner of a spatial truss, which comprises longitudinally and transversely oriented and diagonal and upright interconnected supporting beam elements.

10. The overhead conveying device according to claim 6, in which the supporting beam elements of the side parts have a closed tubular cross-section.

11. The overhead conveying device according to claim 1, in which the supporting framework is a welded structure.

12. The overhead conveying device according to claim 1, including a safety floor hung from the supporting framework, said safety floor extending in an entire area below the conveying devices and above the free space.

13. The overhead conveying device according to claim 1, characterized in that the supporting framework is self-supporting and transportable, at least partially, in preassembled form.

* * * * *